United States Patent [19]

Frank et al.

[11] Patent Number: 5,319,249

[45] Date of Patent: Jun. 7, 1994

[54] POWER CONVERSION SYSTEM MODIFICATION TO PERMIT USE OF DC POWER SOURCE

[75] Inventors: Thomas A. Frank, Middletown, R.I.; Claude D. Michel, Fall River, Mass.

[73] Assignee: The United States of America as represented by the Secretary of the Navy, Washington, D.C.

[21] Appl. No.: 926,112

[22] Filed: Aug. 7, 1992

[51] Int. Cl.[5] .................................................. H02J 9/00
[52] U.S. Cl. ...................................... 307/66; 307/48; 363/59; 320/28
[58] Field of Search ...................... 363/59, 65, 67, 69; 307/46, 48, 66, 44; 322/20, 28, 37

[56] References Cited

U.S. PATENT DOCUMENTS

| | | | |
|---|---|---|---|
| 4,641,042 | 2/1987 | Miyazawa | 307/66 |
| 4,694,194 | 9/1987 | Hansel et al. | 307/66 |
| 4,916,329 | 4/1990 | Dang et al. | 307/66 |
| 5,019,717 | 5/1991 | McCurrey et al. | 307/66 |
| 5,198,698 | 3/1993 | Paul et al. | 307/64 |

*Primary Examiner*—Emanuel T. Voeltz
*Assistant Examiner*—Adolf Berhang
*Attorney, Agent, or Firm*—Michael J. McGowan; Prithvi C. Lall; Michael F. Oglo

[57] ABSTRACT

In an electrical power conversion system designed to operate on three-phase AC voltage generated by a motor generator, a modification is provided to permit the use of a DC power source to operate same. The power conversion system has a plurality of AC-to-DC conversion means for converting the generated three-phase AC voltages. The first specified DC voltage is supplied to a voltage reduction means and the second specified DC voltage is supplied to a control logic circuit of the power source and means, utilizing power from said DC power source, for supplying DC voltages equivalent to the first and second specified DC voltages. The supplying means is isolated from the generated three-phase voltage such that the power conversion system can operate on: 1) three-phase AC voltage generated by the motor generator, 2) DC voltages equivalent to the first and second specified DC voltages from the supplying means, or 3) a combination of the three-phase AC voltage generated by the motor generator and the DC voltages from the supplying means.

4 Claims, 1 Drawing Sheet

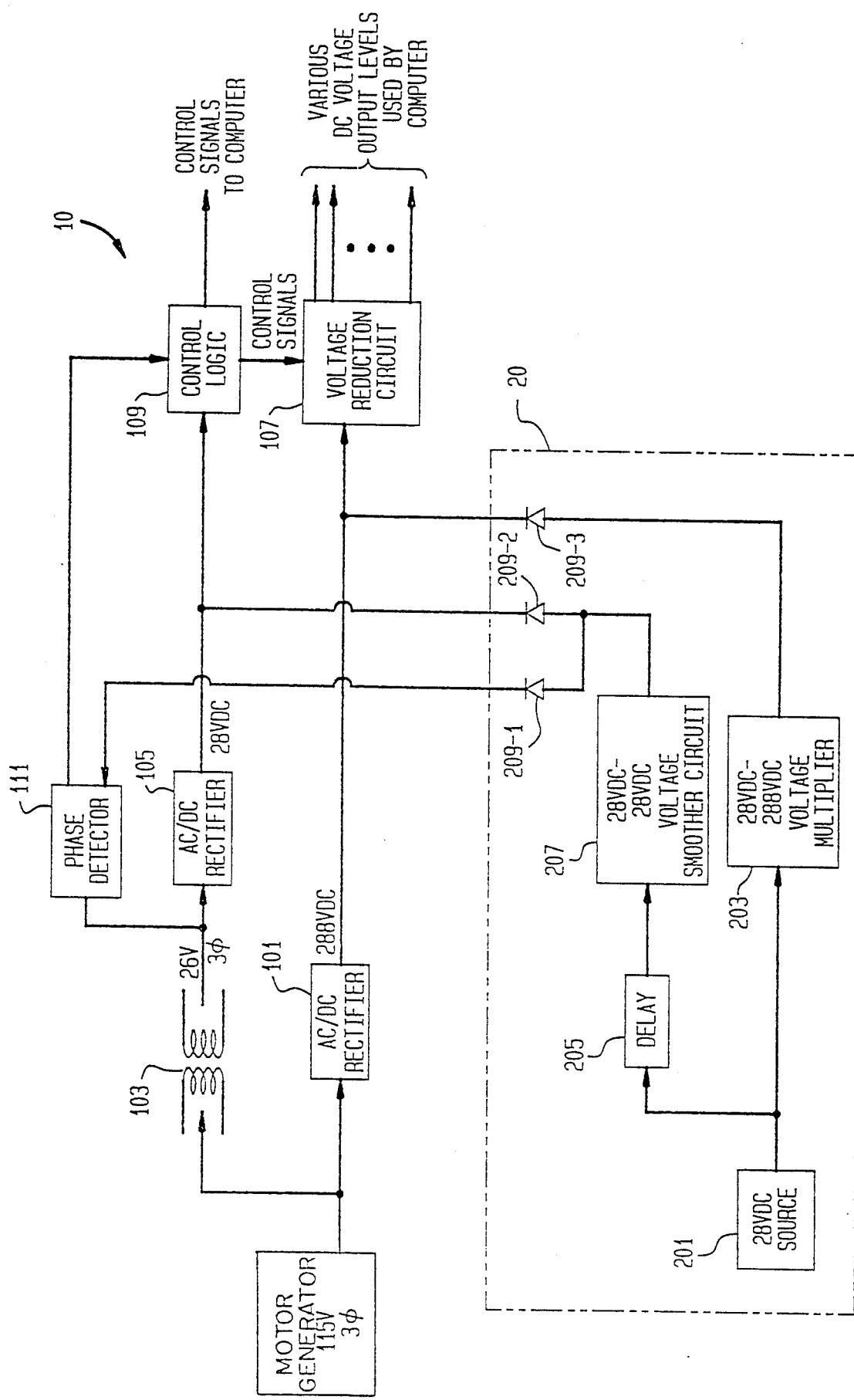

POWER CONVERSION SYSTEM MODIFICATION TO PERMIT USE OF DC POWER SOURCE

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The present invention relates generally to electrical power conversion systems designed to operate on three-phase, AC voltage, and more particularly to an improvement for such an electrical power conversion system that allows for its operation when no three-phase, AC voltage is available.

(2) Description of the Prior Art

Many of today's high speed computer circuits require a variety of stable DC voltages for proper operation. Since most of these computers are used in environments where three-phase, AC voltage is the primary and most convenient energy source (i.e., via a standard electrical outlet), electrical power conversion systems have been developed to convert the available AC into the needed DC voltages. Thus, the power conversion system has become a standard, integral system in computer design. However, certain applications exist that could well make use of existing computer architecture except for the fact that there is no way to provide the necessary three-phase, AC voltage required to power the system.

For example, the U.S. Navy uses its "Standard Airborne Computer" (AN/AYK-14(V)) in a wide variety of applications in both aircraft and seagoing vessels. The computer uses a 115 volt AC three-phase 400 Hz motor generator as the operating power source and integral power conversion system such as the Control Data Corporation PCM-1. This is not a problem in either aircraft or seagoing vessels since motor generators, which are present for a variety of other uses, are available to generate the necessary AC power. However, certain Naval applications neither have a motor generator available nor would the presence of one be desirable due to the noise signature associated with a motor generator. Unfortunately, if the standard Navy computer and integral power conversion system cannot be used in these certain applications due to the unavailability of the proper AC power source, development of these applications may be canceled due to increased cost associated with a special computer design.

SUMMARY OF THE INVENTION

Accordingly, it is an object of the present invention to provide an apparatus that will allow the use of a standard computer designed to operate from an AC power source when no AC power is present.

Another object of the present invention is to provide an apparatus that will allow the Navy to use its Standard Airborne Computer even in applications when no motor generator is available.

Still another object of the present invention is to provide an apparatus that will allow the Navy to use its Standard Airborne Computer in applications that preclude the use of a motor generator for reasons of stealth.

Yet another object of the present invention is to provide an apparatus that will allow the Navy Standard Airborne Computer to continue operation even if an available motor generator fails to supply the necessary three-phase AC voltage.

Other objects and advantages of the present invention will become more obvious hereinafter in the specification and drawings.

In accordance with the present invention, a computer's integral electrical power conversion system is designed to operate on 115 volt, three-phase AC voltage generated by a motor generator. The power conversion system has a plurality of AC-to-DC conversion means for converting the generated three-phase AC voltage into a nominal 288 DC voltage and a stable 28 DC voltage. The 288 volts is supplied to a voltage reduction means including a 20 kHz switching circuit and a step-down transformer, and the 28 volts is used to power control logic of the power conversion system. The power conversion system further includes a phase detector for detecting the presence or absence of the generated three-phase AC voltage and for terminating the operation of the power conversion system based on the absence of same. The power conversion system includes a control logic circuit and a phase detector to obtain the required bias voltage for the computer. Such a power conversion system may be improved by providing the means for operating same from a DC power source. In particular, means are provided that utilize power from the DC power source to supply the 288 volt DC voltage to the voltage reduction means. This power source also supplies the 28 volt DC voltage to: 1) power the control logic circuit, and 2) the phase detector to prevent the termination of the operation of the power conversion system in the event that the 115 volt, three-phase AC voltage is not available due to a malfunctioning of one or more lines thereof. Furthermore, this power source is isolated from the generated three-phase voltage such that the power conversion system can receive operational power from: 1) the motor generator, 2) the DC power source, or 3) a combination of the motor generator and the DC power source.

BRIEF DESCRIPTION OF THE DRAWING(S)

Other objects, features and advantages of the present invention will become apparent upon reference to the following description of the preferred embodiments and to the drawings, wherein:

The sole FIGURE is a block diagram showing the essentials of the present invention as it is connected to the existing power conversion components of a Navy Standard Airborne Computer.

DESCRIPTION OF THE PREFERRED EMBODIMENT(s)

Referring now to the sole FIGURE used to describe the present invention, a block diagram shows the relevant portions of a power conversion system, designated generally by reference numeral 10, as well as the modification of the present power conversion system as contained within the dotted line box 20. For purposes of description, the power conversion system 10 will be the Control Data Corporation PCM-1 (Part No. 10674300-14) utilized by the Navy's Standard Airborne Computer (AN/AYK-14(V)) described briefly above.

Power conversion system 10 receives 115 volt AC, three-phase 400 Hz from, for example, a motor generator (not shown). The three-phase AC voltage is rectified by an AC-DC voltage rectifier 101 where a nominal 288 volts DC is output therefrom. The three-phase AC voltage is also fed through a step-down transformer 103 to produce preferably a 26 volt AC, three-phase voltage. This reduced AC voltage is rectified by an AC-DC rectifier 105 where a stable 28 volts DC is output therefrom. The 288 volts DC is supplied to a voltage reduction circuit 107 which will generate the various DC voltages (e.g. +5 VDC, +15 VDC, −12 VDC, −5 VDC) required for use by the Standard Airborne Computer (not shown and hereinafter referred to simply as the "computer"). Circuit 107 includes high frequency switching circuits and rectifiers to generate various biasing voltages for the computer. The 28 volts DC from AC-DC rectifier 105 is used to power the control logic circuitry 109 of power conversion system 10. Control logic 109 generates the necessary control signals for both the voltage reduction circuit 107 and the computer. The control signals are used, for example, to control the sequence of application of the various DC voltages output from voltage reduction circuit 107 to the computer.

In addition, power conversion system 10 is equipped with a phase detector 111 that detects the presence or absence of the required power. In its simplest embodiment, phase detector 11 can be connected to the secondary wiring of transformer 103 to measure the voltage of any one of the three legs of the three-phase AC voltage. If no voltage is detected in any one and/or all of the legs of power lines, phase detector 111 sends a signal to control logic 109 to terminate system operation. Thus, the overall system is protected from either a no power or power interrupt situation. Thus, phase detector 111 monitors any malfunction in the three phase AC power line and advises control logic circuit 109 accordingly.

Unfortunately, as mentioned above, it is not always practical or desirable to power the power conversion system 10 (and, in essence, the computer) from a motor generator supplying 115 volt AC, three-phase power. At the same time, it is desirable to utilize existing computer architecture such as the computer and integral power conversion system described above. Accordingly, the modification 20 makes use of a DC power source 201 (e.g., a battery) capable of generating 28 volts DC. The 28 volts is fed, in one instance, to a voltage multiplier 203 in order to generate 288 volts DC which is supplied to voltage reduction circuit 107.

The 28 volts DC is also fed through a delay circuit 205 and a voltage smoothing circuit 207 (i.e., a DC to DC converter module), which includes a high frequency (preferably 20 kHz) switching circuit rectifier, in order to generate a stable 28 volts DC supplied to both control logic circuit 109 and phase detector 111. Delay circuit 205 is chosen to compensate for the time needed for voltage multiplier 203 to generate the 288 volts DC. This is required because control logic 109 begins "power up" checks as soon as it receives its 28 volts DC. It should be noted that such a delay is not needed in the existing AC powered version since the time delay occurs naturally via the generation of the 28 volts DC from rectifier 105.

The 28 volts DC from smoothing circuit 207 is also fed to phase detector 111. Since the phase detector 111 checks all legs of the generated three-phase AC voltage as described above, the 28 volts DC from smoothing circuit 207 can be used to indicate to phase detector 111 the presence of a valid power source.

In order to protect the DC supply circuit 20, a series of blocking diodes 209-1, 209-2 and 209-3 are biased to electrically isolate the DC circuit 20 from the generated AC voltage. Additional blocking diodes may be used in the return line (not shown) to protect DC circuit 20. Furthermore, use of these diodes permits the power conversion system 10 to operate using the 115 volt AC voltage from a motor generator or the 28 volt DC voltage from DC source 201. In terms of safety, the blocking diodes prevent AC voltage from appearing on an external connector when the DC supply circuit 20 is disconnected therefrom.

The advantages of the present invention are numerous. The present invention allows a standard AC powered computer architecture to be used even when AC power is not available or when the generation of such AC power is not desirable. In this way, future systems using the Navy Standard Airborne Computer can be designed without being concerned with the availability/desirability of a noisy motor generator. Furthermore, the present invention can be connected in tandem with a motor generator so as to serve as a back-up power system. In this way, the system can operate on AC or DC power, whichever is available and is, therefore, not susceptible to power interruptions. Finally, the present invention prohibits the appearance of AC voltage at any external connector when the DC supply circuit is removed, thereby providing for safety in any of its operational modes.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. In an electrical power conversion system designed to operate on three-phase AC voltage generated by a motor generator, the power conversion system having a plurality of AC-to-DC conversion means for converting the generated three-phase AC voltage into first and second specified DC voltages, the power conversion system further including a phase detector for detecting the presence or absence of the generated three-phase AC voltage and for terminating the operation of the power conversion system based on the absence of the three-phase AC voltage, wherein the first specified DC voltage is supplied to a voltage reduction means and the second specified DC voltage is supplied to control logic of the power conversion system, the improvement comprising:

a DC power source;
 means, utilizing power from said DC power source, for supplying DC voltages equivalent to the first and second specified DC voltage, wherein said DC voltage equivalent to the first specified voltage is supplied to the voltage reduction means and said DC voltage equivalent to the second specified voltage is supplied to the phase detector to simulate the presence of the generated three-phase AC voltage to prevent the termination of the operation of the power conversion system in the even that the three-phase AC voltage is not available; and
 a plurality of blocking diodes disposed between said means for supplying and the generated three-phase AC voltage for isolating said means for supplying from the generated three-phase voltage, whereby the power conversion system can operate on: 1) three-phase AC voltage generated by the motor generator, and 2) DC voltages equivalent to the first and second specified DC voltages.

2. An electrical power conversion system as in claim 1, the improvement further comprising means for delaying the supply of the first specified DC voltage until the second specified DC voltage has attained an acceptable voltage level.

3. An electrical power conversion system as in claim 1, wherein the generated three-phase AC voltage is 115 volts, the first specified voltage is a nominal 288 volts DC, the second specified DC voltage is a stable 28 volts DC, and said power source is a 28 volt DC power source.

4. In an electrical power conversion system designed to operate on 115 volt, three-phase AC voltage generated by a motor generator, the power conversion system having a plurality of AC-to-DC conversion means for converting the generated three-phase AC voltage into a nominal 288 DC voltage and a stable 28 DC voltage, wherein the 288 volts is supplied to a voltage reduction means and the 28 volts is used to power control logic of the power conversion system, the power conversion system further including a phase detector for detecting the presence or absence of the generated three-phase AC voltage and for terminating the operation of the power conversion system based on the absence of the three-phase AC voltage, the improvement comprising:

a DC power source;

means, utilizing power from said DC power source, for supplying a first voltage equivalent to the 288 volt DC voltage to the voltage reduction means, and for supplying a second voltage equivalent to the 28 volt DC voltage to power the control logic and the phase detector to prevent the termination of the operation of the power conversion system in the event that the 115 volt, three-phase AC voltage is not available;

means for delaying the supply of said second voltage until said first voltage has attained an acceptable voltage level at the voltage reduction means; and a plurality of blocking diodes disposed between said means for supplying and the generated three-phase AC voltage for isolating said means for supplying from the generated three-phase voltage, whereby the power conversion system can receive operational power from: 1) the motor generator, and 2) said improvement.

* * * * *